US011958506B2

(12) United States Patent
Kobayashi et al.

(10) Patent No.: US 11,958,506 B2
(45) Date of Patent: Apr. 16, 2024

(54) VEHICLE CONTROL DEVICE AND VEHICLE CONTROL METHOD

(71) Applicant: HONDA MOTOR CO., LTD., Tokyo (JP)

(72) Inventors: Hiroyuki Kobayashi, Wako (JP); Koichiro Wada, Wako (JP); Yudai Hasegawa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 18/024,514

(22) PCT Filed: Dec. 28, 2020

(86) PCT No.: PCT/JP2020/049099
§ 371 (c)(1),
(2) Date: Mar. 3, 2023

(87) PCT Pub. No.: WO2022/144957
PCT Pub. Date: Jul. 7, 2022

(65) Prior Publication Data
US 2023/0347942 A1 Nov. 2, 2023

(51) Int. Cl.
B60W 60/00 (2020.01)
B60W 30/14 (2006.01)
(Continued)

(52) U.S. Cl.
CPC ........ B60W 60/005 (2020.02); B60W 30/143 (2013.01); B60W 30/182 (2013.01);
(Continued)

(58) Field of Classification Search
None
See application file for complete search history.

(56) References Cited

U.S. PATENT DOCUMENTS

2016/0305794 A1  10/2016  Horita et al.
2019/0018410 A1*  1/2019  Ando ................. B60W 30/182
(Continued)

FOREIGN PATENT DOCUMENTS

CN      105793669       7/2016
CN      108875603       11/2018
(Continued)

OTHER PUBLICATIONS

Copy and translation of KR19980072993A, Ku, 1998 (Year: 1998).*
(Continued)

Primary Examiner — James J Lee
Assistant Examiner — Andrew Sang Kim
(74) Attorney, Agent, or Firm — Amin, Turocy & Watson, LLP

(57) ABSTRACT

A vehicle control device includes a recognizer configured to recognize a position of a vehicle, a driving controller configured to control one or both of acceleration/deceleration and steering of the vehicle and to cause the vehicle to travel in one of a plurality of driving modes in which tasks imposed on an occupant of the vehicle are different, and a mode determiner configured to determine a driving mode which is to be performed by the driving controller. The recognizer recognizes first road information including road marking objects near the vehicle with respect to a position of the vehicle on the basis of a recognition result from an external sensor, recognizes second road information including road marking objects near the vehicle from map information on the basis of position information of the vehicle, and performs a process of recognizing the position of the vehicle through matching between the first road information and the second road information. The mode determiner switches the driving mode of the vehicle to a driving mode in which a task imposed on the occupant of the vehicle is (Continued)

heavier than that of a driving mode which is being performed by the vehicle when switching conditions for switching the driving mode of the vehicle are satisfied after the position of the vehicle has become unable to be recognized.

8 Claims, 9 Drawing Sheets

(51) Int. Cl.
*B60W 30/182* (2020.01)
*B60W 50/14* (2020.01)
(52) U.S. Cl.
CPC ......... *B60W 50/14* (2013.01); *B60W 2520/00* (2013.01); *B60W 2552/53* (2020.02)

(56) References Cited

U.S. PATENT DOCUMENTS

| | | |
|---|---|---|
| 2020/0094837 A1 | 3/2020 | Kato |
| 2020/0207346 A1 | 7/2020 | Tsuji et al. |

FOREIGN PATENT DOCUMENTS

| | | |
|---|---|---|
| CN | 110949388 | 4/2020 |
| JP | 2015-108604 | 6/2015 |
| JP | 2018-027726 | 2/2018 |
| JP | 2019038289 A * | 3/2019 |
| JP | 2020-001668 | 1/2020 |
| JP | 2020-050086 | 4/2020 |
| JP | 111391834 | 7/2020 |
| KR | 10-2000395 | 10/2019 |

OTHER PUBLICATIONS

Google English Translation of JP-2019038289-A (Year: 2019).*
International Search Report and Written Opinion for International Application No. PCT/JP2020/049099 dated Mar. 23, 2021, 9 pages.
Chinese Office Action for Chinese Patent Application No. 202080104947.0 dated Jul. 15, 2023.

* cited by examiner

FIG. 3

| DRIVING MODE | CONTROL STATE | TASK |
|---|---|---|
| MODE A | AUTOMATED DRIVING | FORWARD MONITORING: UNNECESSARY STEERING WHEEL GRASP: UNNECESSARY |
| MODE B | DRIVING SUPPORT | FORWARD MONITORING: NECESSARY STEERING WHEEL GRASP: UNNECESSARY |
| MODE C | DRIVING SUPPORT | FORWARD MONITORING: NECESSARY STEERING WHEEL GRASP: NECESSARY |
| MODE D | DRIVING SUPPORT | FORWARD MONITORING: NECESSARY AT LEAST SOME DRIVING OPERATION IS NECESSARY |
| MODE E | MANUAL DRIVING | FORWARD MONITORING: NECESSARY DRIVING OPERATION IS NECESSARY FOR BOTH STEERING AND ACCELERATION |

↑ TASK: LIGHT

↓ TASK: HEAVY

VEHICLE CONTROL DEVICE AND VEHICLE CONTROL METHOD

TECHNICAL FIELD

The present invention relates to a vehicle control device, a vehicle control method, and a program.

BACKGROUND ART

In recent years, automated driving of automatically controlling travel of a vehicle has been studied. In this regard, a technique of notifying a driver of a manual driving preparation request and then notifying the driver of an automated driving end request when the driver is requested to end automated driving while the automated driving based on a surrounding situation and a position of a host vehicle is being performed is known (for example, see Patent Literature 1).

CITATION LIST

Patent Literature

[Patent Literature 1]
Japanese Unexamined Utility Model Application, First Publication No. 2018-27726

SUMMARY OF INVENTION

Technical Problem

However, timings for switching driving control in a state in which a position of a host vehicle is unable to be recognized and recognition accuracy deteriorates are not considered. Accordingly, a driver may not be sufficiently allowed to prepare to drive, and appropriate driving control may not be performed.

An aspect of the present invention was invented in consideration of the aforementioned circumstances and an objective thereof is to provide a vehicle control device, a vehicle control method, and a program that can allow a vehicle to travel under more appropriate driving control.

Solution to Problem

A vehicle control device, a vehicle control method, and a program according to the present invention employ the following configurations.

(1) According to an aspect of the present invention, there is provided a vehicle control device including: a recognizer configured to recognize a position of a vehicle; a driving controller configured to control one or both of acceleration/deceleration and steering of the vehicle and to cause the vehicle to travel in one of a plurality of driving modes in which tasks imposed on an occupant of the vehicle are different; and a mode determiner configured to determine a driving mode which is to be performed by the driving controller, wherein the recognizer recognizes first road information including road marking objects near the vehicle with respect to a position of the vehicle on the basis of a recognition result from an external sensor, recognizes second road information including road marking objects near the vehicle from map information on the basis of position information of the vehicle, and performs a process of recognizing the position of the vehicle through matching between the first road information and the second road information, and wherein the mode determiner switches the driving mode of the vehicle to a driving mode in which a task imposed on the occupant of the vehicle is heavier than that of a driving mode which is being performed by the vehicle when switching conditions for switching the driving mode of the vehicle are satisfied after the position of the vehicle has become unable to be recognized.

(2) In the aspect according to (1), the switching conditions may include a condition that a predetermined time elapses after the position of the vehicle has become unable to be recognized.

(3) In the aspect according to (1) or (2), the switching conditions may include a condition that the vehicle has moved by a predetermined width in a width direction of a travel lane after the position of the vehicle has become unable to be recognized.

(4) In the aspect according to one of (1) to (3), the switching conditions may include a condition that the vehicle has traveled a travelable distance derived on the basis of a speed of the vehicle and a direction of the vehicle at a time point at which the recognizer has become unable to recognize the position of the vehicle after the position of the vehicle has become unable to be recognized.

(5) In the aspect according to one of (1) to (4), the switching conditions may include a condition that the vehicle has traveled a travelable distance derived on the basis of a speed of the vehicle and curvature information of a road in which the vehicle is traveling at a time point at which the recognizer has become unable to recognize the position of the vehicle after the position of the vehicle has become unable to be recognized.

(6) In the aspect according to one of (1) to (5), the vehicle control device may further include a counter configured to increase a count value at a first rate of increase with the elapse of a time in which matching between the first road information and the second road information fails, and the mode determiner may switch the driving mode of the vehicle to a driving mode in which a task imposed on the occupant of the vehicle is heavier than that of a driving mode which is being performed by the vehicle when the count value of the counter is equal to or greater than a threshold value.

(7) In the aspect according to (6), the counter may be configured to decrease the count value at a first rate of decrease when the matching between the first road information and the second road information succeeds after the matching has failed and to increase the count value from the decreased current count value at a second rate of increase when the matching fails again.

(8) In the aspect according to (7), an absolute value of the first rate of decrease may be greater than an absolute value of the first rate of increase.

(9) According to another aspect of the present invention, there is provided a vehicle control method that is performed by a computer, the vehicle control method including: recognizing a position of a vehicle; controlling one or both of acceleration/deceleration and steering of the vehicle; causing the vehicle to travel in one of a plurality of driving modes in which tasks imposed on an occupant of the vehicle are different; recognizing first road information including road marking objects near the vehicle with respect to a position of the vehicle on the basis of a recognition result from an external sensor, recognizing second road information including road marking objects near the vehicle from map information on the basis of position information of the vehicle, and performing a process of recognizing the position of the vehicle through matching between the first road information and the second road information; and switching the driving mode of the vehicle to a driving mode in which a task imposed on the occupant of the vehicle is heavier than that of a driving mode which is being performed by the vehicle when switching conditions for switching the driving mode of the vehicle are satisfied after the position of the vehicle has become unable to be recognized.

(10) According to another aspect of the present invention, there is provided a program causing a computer to perform: recognizing a position of a vehicle; controlling one or both of acceleration/deceleration and steering of the vehicle; causing the vehicle to travel in one of a plurality of driving modes in which tasks imposed on an occupant of the vehicle are different; recognizing first road information including road marking objects near the vehicle with respect to a position of the vehicle on the basis of a recognition result from an external sensor, recognizing second road information including road marking objects near the vehicle from map information on the basis of position information of the vehicle, and performing a process of recognizing the position of the vehicle through matching between the first road information and the second road information; and switching the driving mode of the vehicle to a driving mode in which a task imposed on the occupant of the vehicle is heavier than that of a driving mode which is being performed by the vehicle when switching conditions for switching the driving mode of the vehicle are satisfied after the position of the vehicle has become unable to be recognized.

Advantageous Effects of Invention

According to the aspects of (1) to (10), it is possible to allow a vehicle to travel under more appropriate driving control.

BRIEF DESCRIPTION OF DRAWINGS

FIG. 3 is a diagram illustrating an example of correspondence between driving modes and control states of a vehicle M and tasks.

DESCRIPTION OF EMBODIMENTS

Hereinafter, a vehicle control device, a vehicle control method, and a program according to an embodiment of the present invention will be described with reference to the accompanying drawings.

[Whole Configuration]

Figure 1:
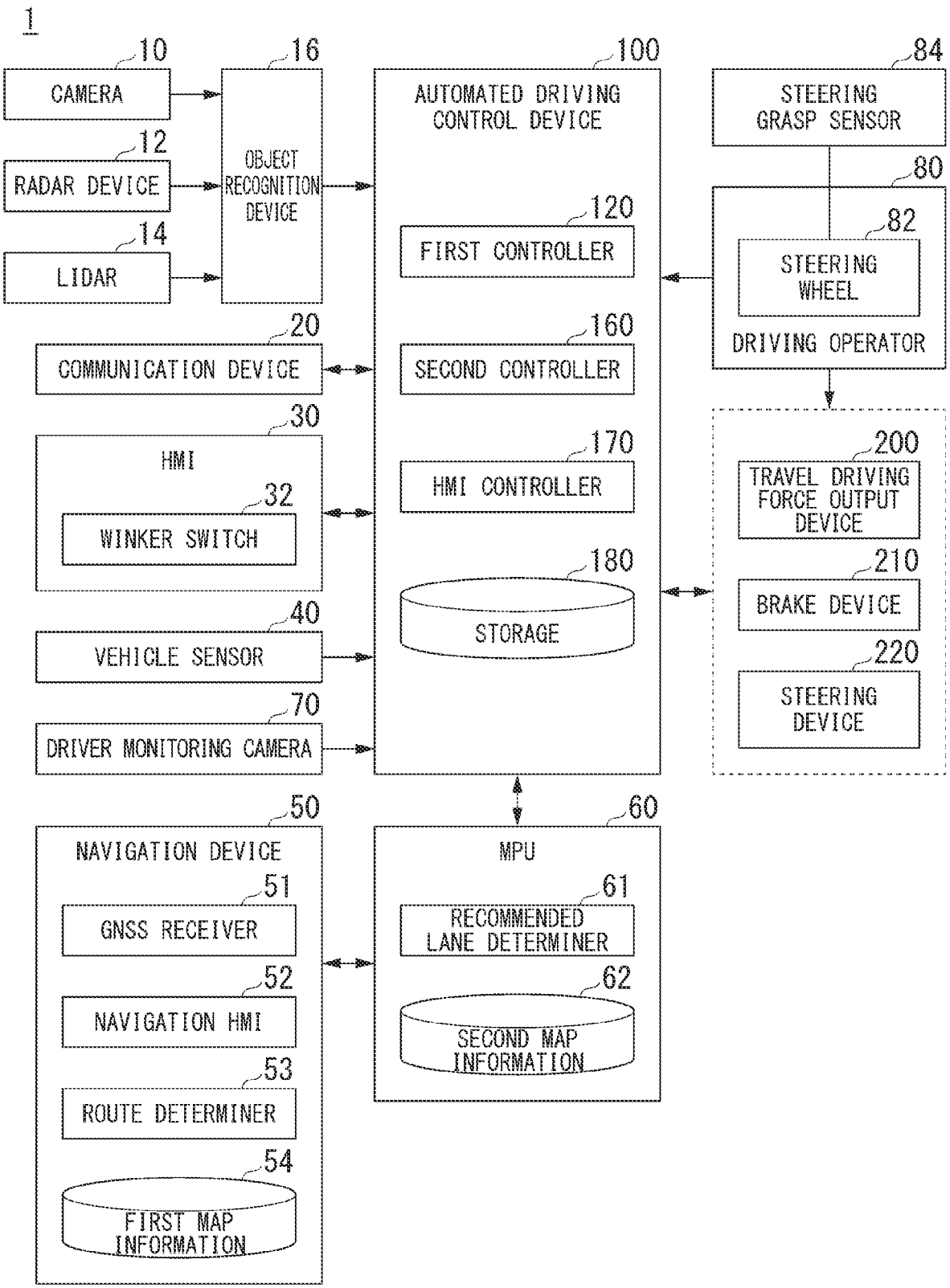
FIG. 1 is a diagram illustrating a configuration of a vehicle system 1 employing a vehicle control device according to an embodiment.

FIG. 1 is a diagram illustrating a configuration of a vehicle system 1 employing a vehicle control device according to an embodiment. A vehicle in which the vehicle system 1 is mounted is, for example, a vehicle with two wheels, three wheels, or four wheels and a drive source thereof is an internal combustion engine such as a diesel engine or a gasoline engine, an electric motor, or a combination thereof. The electric motor operates using electric power generated by a power generator connected to the internal combustion engine or electric power discharged from a secondary battery or a fuel cell. An embodiment in which a vehicle control device is applied to an automated driving vehicle will be described below as an example. Automated driving is, for example, performing driving control by automatically controlling one or both of acceleration/deceleration and steering of a vehicle. The driving control of a vehicle may include, for example, various driving supports such as adaptive cruise control (ACC) or lane keeping assist system (LKAS). An automated driving vehicle may be controlled through manual driving of an occupant (driver).

The vehicle system 1 includes, for example, a camera 10, a radar device 12, a Light Detection and Ranging (LiDAR) device 14, an object recognition device 16, a communication device 20, a human-machine interface (HMI) 30, a vehicle sensor 40, a navigation device 50, a map positioning unit (MPU) 60, a driver monitoring camera 70, a driving operator 80, an automated driving control device 100, a travel driving force output device 200, a brake device 210, and a steering device 220. These devices or instruments are connected to each other via a multiplex communication line such as a controller area network (CAN) communication line, a serial communication line, a radio communication network, or the like. The configuration illustrated in FIG. 1 is only an example and a part of the configuration may be omitted or another configuration may be added thereto. A combination of the camera 10, the radar device 12, and the LIDAR device 14 is an example of an "external sensor." The external sensor may include another detector that recognizes a surrounding situation of a vehicle or may include the object recognition device 16. The automated driving control device 100 is an example of a "vehicle control device."

The camera 10 is, for example, a digital camera using a solid-state imaging device such as a charge coupled device (CCD) or a complementary metal oxide semiconductor (CMOS). The camera 10 is attached to an arbitrary position on a vehicle in which the vehicle system 1 is mounted (hereinafter, referred to as a vehicle M). When a front view of the vehicle is imaged, the camera 10 is attached to an upper part of a front windshield, a rear surface of a rearview mirror, or the like. The camera 10 images surroundings of the vehicle M, for example, periodically and repeatedly. The camera 10 may be a stereoscopic camera.

The radar device 12 radiates radio waves such as millimeter waves to the surroundings of the vehicle M, detects radio waves (reflected waves) reflected by an object, and detects at least a position (a distance and a direction) of the object. The radar device 12 is attached to an arbitrary position on the vehicle M. The radar device 12 may detect a position and a speed of an object using a frequency modulated continuous wave (FM-CW) method.

The LIDAR device 14 emits light (or electromagnetic waves of wavelengths close to those of light) to the surroundings of the vehicle M and measures scattered light. The LIDAR device 14 detects a distance to an object based on a time from emission of light to reception of light. The emitted light is, for example, a pulse-like laser beam. The LIDAR device 14 is attached to an arbitrary position on the vehicle M.

The object recognition device 16 performs a sensor fusion process on results of detection from some or all of the camera 10, the radar device 12, and the LIDAR device 14 and recognizes a position, a type, a speed, and the like of an object. The object recognition device 16 outputs the result of recognition to the automated driving control device 100. The object recognition device 16 may output the results of detection from the camera 10, the radar device 12, and the LIDAR device 14 to the automated driving control device 100 without any change. The object recognition device 16 may be omitted from the vehicle system 1.

The communication device 20 communicates with other vehicles near the vehicle M, for example, using a cellular network, a Wi-Fi network, Bluetooth (registered trademark), or dedicated short range communication (DSRC) or communicates with various server devices via radio base stations.

The HMI 30 presents various types of information to an occupant of the vehicle M and receives an input operation from the occupant under the control of the HMI controller 170. The HMI 30 includes, for example, various display devices, speakers, microphones, buzzers, a touch panel, switches, and keys. Examples of the switches include a winker switch (a direction indicator) 32. The winker switch 32 is provided, for example, in a steering column or a steering wheel. The winker switch 32 is an example of an operator that receives an instruction to change a lane for the vehicle M from an occupant.

The vehicle sensor 40 includes a vehicle speed sensor that detects a speed of the vehicle M, an acceleration sensor that detects an acceleration, a yaw rate sensor that detects an angular velocity around a vertical axis, and a direction sensor that detects a direction of the vehicle M. The vehicle sensor 40 may include a steering angle sensor that detects a rotation angle (a steering angle) of a steering shaft. The vehicle sensor 40 may include a position sensor that detects the position of the vehicle M. The position sensor is, for example, a sensor that acquires position information (longitude/latitude information) of the vehicle M from a global positioning system (GPS) device. The position sensor may be a sensor that acquires the position information of the vehicle M using a global navigation satellite system (GNSS) receiver 51 of the navigation device 50. The result of detection from the vehicle sensor 40 is output to the automated driving control device 100.

The navigation device 50 includes, for example, a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 identifies the position of the vehicle M based on signals received from GNSS satellites. The position of the vehicle M may be identified or corrected by an inertial navigation system (INS) using the output of the vehicle sensor 40. The navigation HMI 52 includes, for example, a display device, a speaker, a touch panel, and keys. All or some elements of the navigation HMI 52 may be shared by the HMI 30. For example, the route determiner 53 determines a route (hereinafter referred to as a route on a map) from the position of the vehicle M identified by the GNSS receiver 51 (or an input arbitrary position) to a destination input by an occupant using the navigation HMI 52 with reference to the first map information 54. The first map information 54 is, for example, information in which road shapes are expressed by links indicating roads and nodes connected by the links. The first map information 54 may include curvature information (curvatures or radii of curvature) of roads or point of interest (POI) information. The route on a map is output to the MPU 60. The navigation device 50 may perform route guidance using the navigation HMI 52 based on the route on a map. The navigation device 50 may be realized, for example, by a function of a terminal device such as a smartphone or a tablet terminal which is carried by an occupant. The navigation device 50 may transmit a current position and a destination to a navigation server via the communication device 20 and acquire a route equivalent to the route on a map from the navigation server.

The MPU 60 includes, for example, a recommended lane determiner 61 and stores second map information 62 in a storage device such as an HDD or a flash memory. The recommended lane determiner 61 divides the route on a map supplied from the navigation device 50 into a plurality of blocks (for example, blocks at every 100 [m] in a vehicle travel direction) and determines a recommended lane for each block with reference to the second map information 62. The recommended lane determiner 61 determines on which lane from the leftmost the vehicle M is to travel. When there is a branching point in the route on a map, the recommended lane determiner 61 determines a recommended lane such that the vehicle M travels on a rational route for movement to a branching destination.

The second map information 62 is map information with higher precision than the first map information 54. The second map information 62 includes, for example, information on the centers of lanes or information on boundaries of lanes. The second map information 62 may include road information including road marking objects. Examples of a road marking object include road marking lines (for example, lane marks such as white lines) defining lanes, road side strips, curbstones, medians, and guard rails. The second map information 62 may include information on patterns of road marking objects (for example, arrangement of solid lines and dotted lines). The road information may include the number of lanes of roads, lane widths, gradients, structures such as traffic signs, traffic signals, walls formed along roads, and fences, address information (addresses and postal codes), facility information, and phone number information in addition to the road marking objects. The second map information 62 may be updated from time to time by causing the communication device 20 to communicate with another device.

The driver monitoring camera 70 is, for example, a digital camera using a solid-state imaging device such as a CCD or a CMOS. The driver monitoring camera 70 is attached to an arbitrary position on the vehicle M in a place and a direction in which the head of an occupant (hereinafter referred to as a driver) sitting on a driver's seat of the vehicle M can be imaged from the front (such that the face of the driver is imaged). For example, the driver monitoring camera 70 is attached to an upper part of a display device which is provided at the central part of an instrument panel of the vehicle M.

The driving operator 80 includes, for example, an accelerator pedal, a brake pedal, a shift lever, and other operators in addition to a steering wheel 82. A sensor that detects an amount of operation or performing of an operation is attached to the driving operator 80, and a result of detection of the sensor is output to the automated driving control device 100 or output to some or all of the travel driving force output device 200, the brake device 210, and the steering device 220. The steering wheel 82 is an example of an "operator that receives a steering operation from a driver." This operator does not have to have a ring shape and may have a shape such as a deformed steering wheel, a joystick, or a button. A steering wheel grasp sensor 84 is attached to the steering wheel 82. The steering wheel grasp sensor 84 is realized by a capacitance sensor or the like and outputs a signal indicating whether a driver grasps the steering wheel 82 (which means contacting the steering wheel with a force applied thereto) to the automated driving control device 100.

The automated driving control device 100 includes, for example, a first controller 120, a second controller 160, an HMI controller 170, and a storage 180. Each of the first controller 120, the second controller 160, and the HMI controller 170 is realized, for example, by causing a hardware processor such as a central processing unit (CPU) to execute a program (software). Some or all of such elements may be realized by hardware (which includes circuitry) such as a large scale integration (LSI), an application-specific integrated circuit (ASIC), or a field-programmable gate array (FPGA), or a graphics processing unit (GPU) or may be realized in a combination of software and hardware. The program may be stored in a storage device (a storage device including a non-transitory storage medium) such as an HDD or a flash memory of the automated driving control device 100 in advance, or may be stored in a removable storage medium such as a DVD or a CD-ROM and installed in the HDD or the flash memory of the automated driving control device 100 by setting the removable storage medium (non-transitory storage medium) to a drive device. A combination of the movement plan creator 140 and the second controller 160 is an example of a "driving controller."

The storage 180 may be realized by the aforementioned various storage devices, a solid state drive (SSD), an electrically erasable programmable read only memory (EE-PROM), a read only memory (ROM), a random access memory (RAM), or the like. The storage 180 stores, for example, information indicating a driving state of the vehicle M, information required for performing driving control in this embodiment, programs, and various types of other information.

Figure 2:
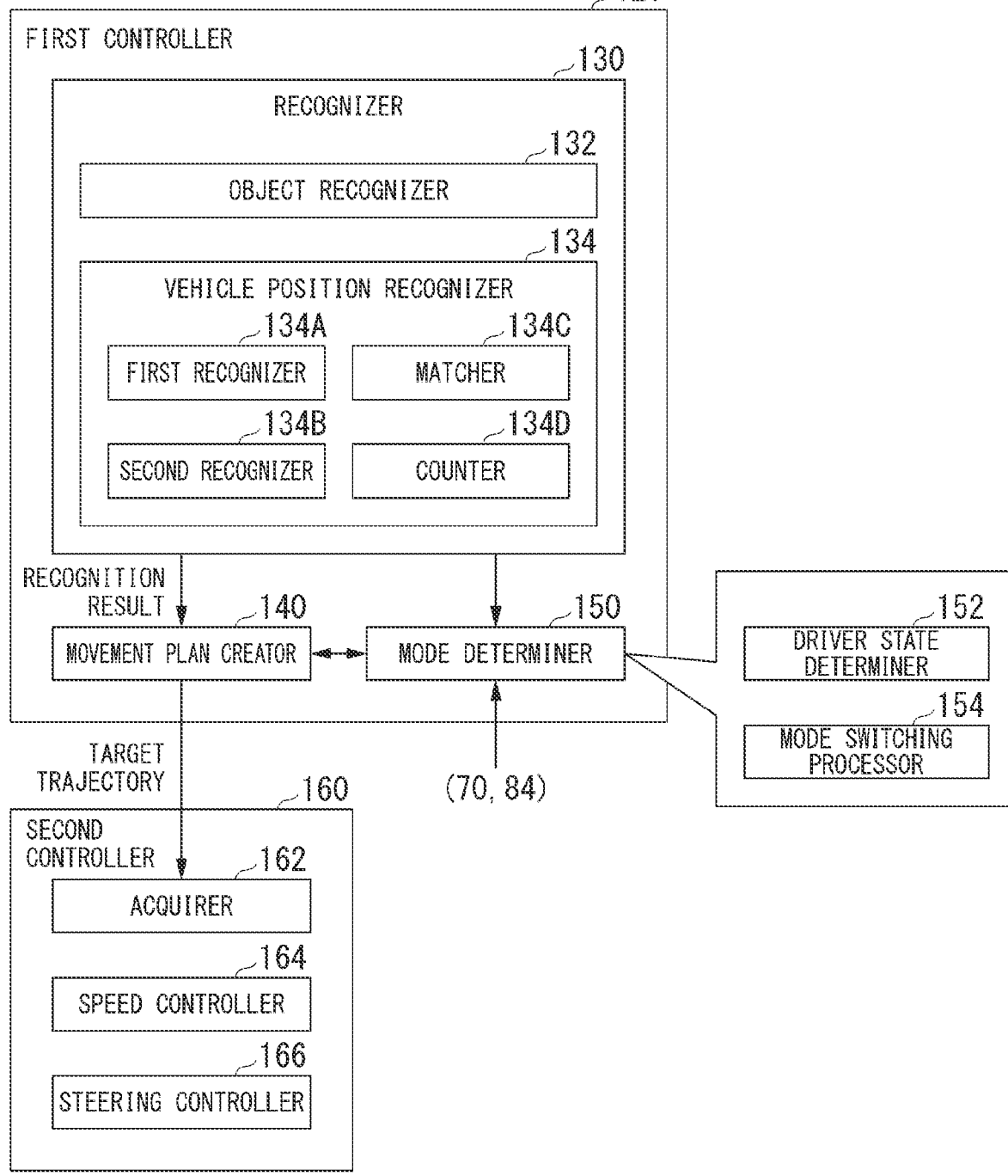
FIG. 2 is a diagram illustrating functional configurations of a first controller 120 and a second controller 160.

FIG. 2 is a diagram illustrating functional configurations of the first controller 120 and the second controller 160. The first controller 120 includes, for example, a recognizer 130, a movement plan creator 140, and a mode determiner 150. The first controller 120 realizes, for example, a function based on an artificial intelligence (AI) and a function based on a predetermined model together. For example, a function of "recognizing a crossing" may be realized by performing recognition of a crossing based on deep learning or the like and recognition based on predetermined conditions (such as signals and road signs which can be pattern-matched), scoring both recognitions, and comprehensively evaluating both recognitions. Accordingly, reliability of automated driving is secured.

The recognizer 130 recognizes a surrounding situation of the vehicle M, for example, on the basis of information input from the camera 10, the radar device 12, and the LIDAR device 14 via the object recognition device 16 or map information (the first map information 54 and the second map information 62). The recognizer 130 includes, for example, an object recognizer 132 and a vehicle position recognizer 134. The object recognizer 132 recognizes states such as a position, a speed, and an acceleration of an object near the vehicle M. For example, a position of an object is recognized as a position in an absolute coordinate system with an origin set to a representative point of the vehicle M (such as the center of gravity or the center of a drive shaft) and is used for control. A position of an object may be expressed as a representative point such as the center of gravity or a corner of the object or may be expressed as an area. A "state" of an object may include an acceleration or a jerk of the object or a "moving state" (for example, whether lane change is being performed or whether lane change is going to be performed) thereof.

The vehicle position recognizer 134 includes, for example, a first recognizer 134A, a second recognizer 134B, a matcher 134C, and a counter 134D. The first recognizer 134A recognizes first road information including a road marking object near the vehicle M (within a predetermined distance) with respect to the position of the vehicle M (hereinafter referred to as a "first road marking object") on the basis of a result of recognition from an external sensor. The first road information may include, for example, a road shape (for example, curvature information and gradients), the number of lanes, lane widths, traffic signs, and traffic signals of a road and structures such as walls or fences formed along the road on which the vehicle M is traveling, which are recognized by an external sensor, in addition to the first road marking object.

The second recognizer 134B recognizes second road information including a road marking object near the vehicle M with respect to the position of the vehicle M (hereinafter referred to as a "second road marking object") from map information with reference to the map information (the first map information 54 and the second map information 62) on the basis of the position information of the vehicle M acquired from the position sensor included in the vehicle sensor 40 of the vehicle M or the GNSS receiver 51 included in the navigation device 50. The second road information includes, for example, a road shape, the number of lanes, lane widths, traffic signs, and traffic signals of a road and structures such as walls or fences formed along the road on which the vehicle M is traveling, which are acquired from the map information, in addition to the second road marking object.

The matcher 134C performs a process of recognizing the position of the vehicle M through matching between the first road information recognized by the first recognizer 134A and the second road information recognized by the second recognizer 134B. For example, when the first road information and the second road information match, the matcher 134C determines that the matching has succeeded and identifies the position (or posture) of the vehicle M on the traveling lane (road). In this case, the matcher 134C may recognize a separation of the reference point of the vehicle M from the lane center and an angle formed by the traveling direction of the vehicle M and a line generated by connecting the lane centers as the position and posture of the vehicle M relative to the traveling lane. Instead, the matcher 134C may recognize a position of the reference point of the vehicle M relative to one lateral end (a road marking object) of the traveling lane and the like as the position of the vehicle M relative to the traveling lane. The reference point of the vehicle M may be the center of the vehicle M or the center of gravity thereof. The reference point may be an end (a front end, a rear end, or a lateral end) of the vehicle M or may be a position at which one of a plurality of wheels of the vehicle M is present.

When the first road information and the second road information do not match, the matcher 134C may determine that the matching has failed and recognize a state in which the position of the vehicle M has become unable to be recognized (identified).

The counter 134D increases a count value at a predetermined rate of increase when the first road information and the second road information do not match (when the matching has failed), and decreases the increased count value at a predetermined rate of decrease when the first road information and the second road information match (when the matching has succeeded). Details of the functions of the vehicle position recognizer 134 will be described later.

The recognizer 130 may recognize a stop line, an obstacle, a red signal, a toll gate, or other road events. The recognizer 130 may recognize a neighboring lane adjacent to the traveling lane.

The movement plan creator 140 creates a target trajectory in which the vehicle M will travel autonomously (without requiring a driver's operation) in the future such that the vehicle M travels in the recommended lane determined by the recommended lane determiner 61 in principle and copes with a surrounding situation of the vehicle M. A target trajectory includes, for example, a speed element. For example, a target trajectory is expressed by sequentially arranging points (trajectory points) at which the vehicle M is to arrive. Trajectory points are points at which the vehicle M is to arrive at intervals of a predetermined traveling distance (for example, every about several [m]) along a road, and a target speed and a target acceleration at intervals of a predetermined sampling time (for example, about below the decimal point [sec]) are generated as a part of a target trajectory in addition thereto. Trajectory points may be positions at which the vehicle M is to arrive at a sampling timing every predetermined sampling time. In this case, information of the target speed or the target acceleration is expressed by intervals between the trajectory points.

The movement plan creator 140 may set events (functions) of automated driving in creating a target trajectory. The events of automated driving include a traffic-jam following travel event, a constant-speed travel event, a low-speed following travel event, a lane change event, a branching event, a merging event, and a takeover event. The movement plan creator 140 creates a target trajectory based on events which are started.

The mode determiner 150 determines one of a plurality of driving modes with different tasks to be imposed on a driver (in other words, a plurality of modes with different automation levels in driving control of the vehicle M) as a driving mode which is performed by the vehicle M. The driving controller causes the vehicle M to travel in the mode determined by the mode determiner 150. The mode determiner 150 includes, for example, a driver state determiner 152 and a mode switching processor 154. These individual functions will be described later.

FIG. 3 is a diagram illustrating an example of correspondence between driving modes and control states of the vehicle M and tasks. A driving mode of the vehicle M includes, for example, five modes including mode A to mode E. Among these modes, a control state, that is, an automation level of driving control, of the vehicle M is the highest in mode A, decreases in the order of mode B, mode C, and mode D, and is the lowest in mode E. On the other hand, a task to be imposed on a driver (an occupant) is the lightest in mode A (light), becomes heavier in the order of mode B, mode C, and mode D (heavy), and is the heaviest in mode E in which manual driving is performed. In modes B to E, since the control state is not an automated driving state, the automated driving control device 100 has to end control associated with automated driving and take charge of transitioning to driving support or manual driving. Details of the driving modes will be exemplified below.

In mode A, the control state is an automated driving state, and none of surrounding monitoring of the vehicle M and grasping of the steering wheel 82 (hereinafter referred to as "steering wheel grasp") is imposed on a driver. Whether a driver is performing surrounding monitoring is determined, for example, on the basis of a result of analysis of an image captured by the driver monitoring camera 70, and whether a driver is performing steering wheel grasp is determined, for example, on the basis of a result of detection from the steering wheel grasp sensor 84. Surrounding monitoring includes at least forward monitoring of the vehicle M (forward monitoring in the drawing). Forward means a space in the travel direction of the vehicle M which is seen via a front windshield. Even in mode A, the driver is requested to take a posture that can rapidly transition to manual driving in response to a request from a system centered on the automated driving control device 100. Automated driving mentioned herein means that both steering and speed of the vehicle M are controlled without requiring a driver's operation. For example, mode A is a driving mode which is executable when conditions in which the vehicle M is traveling at a predetermined speed (for example, about 50 [km/h]) or lower on a motorway such as a highway and a preceding vehicle to be followed which is traveling in the same lane of the vehicle M or a recommended lane is present are satisfied, and is also referred to as a traffic-jam following mode (or a traffic jam pilot (TJP) mode). When the conditions are not satisfied, the mode determiner 150 changes the driving mode of the vehicle M to mode B.

When mode A is being performed, an occupant can perform a second task. The second task is, for example, behavior not associated with driving of the occupant which is permitted during automated driving of the vehicle M. Examples of the second task include enjoying a television program, conversation with a mobile phone, transmitting and receiving a mail, and eating a meal.

In mode B, the control state is a driving support state, a task for monitoring a space in front of the vehicle M (hereinafter referred to as forward monitoring) is imposed on a driver, and a task for grasping the steering wheel 82 is not imposed on the driver. For example, in mode B, lane change of the vehicle M based on setting of a route to a destination in the navigation device 50 is performed according to determination on the vehicle system 1 side instead of receiving a lane change instruction from an occupant. Lane change is to cause the vehicle M to move from a traveling lane in which the vehicle M is traveling (a first lane) to a neighboring lane adjacent to the traveling lane (a second lane).

In mode C, the control state is a driving support state, the task for forward monitoring and the task for grasping the steering wheel 82 are imposed on a driver. For example, in mode C, an occupant is inquired using the HMI 30 when the vehicle system 1 determines that lane change of the vehicle M is necessary, and driving support for performing lane change is performed when an approval for lane change is received from the occupant using the HMI 30 or the like.

Mode D is a driving mode in which a driver's driving operation to a certain extent is required for at least one of steering and acceleration/deceleration of the vehicle M. For example, in mode D, driving support such as adaptive cruise control (ACC) or lane keeping assist system (LKAS) is performed. In mode D, when a lane change instruction for the vehicle M is received by a driver's operating of the winker switch 32, driving support for lane change in the instructed direction is performed. The lane change in mode D is an example of lane change based on detection of a driver's intension. The lane change in mode D may be performed in mode C. The driver's operating of the winker switch 32 is an example of a driving operation. The driving operation in mode D may include a driving operation for controlling steering or acceleration/deceleration. The lane change in modes B to D may be an example of the lane change event.

In mode E, the control state is a manual driving state in which a driver's driving operation is required for both steering and acceleration/deceleration of the vehicle M. In both mode D and mode E, the task for monitoring the space in front of the vehicle M is imposed on a driver. A driving subject in modes C to E is a driver.

The plurality of driving modes which are performed by the vehicle M may include a driving mode (for example, a minimum risk maneuver (MRM) mode) for minimizing a risk in travel of the vehicle M in addition to modes A to E. In the MRM mode, for example, emergency stop in automated driving or the like is performed.

When the vehicle M is in a situation in which a current driving mode cannot be performed, the mode determiner 150 switches the driving mode to a mode suitable for the situation. The mode determiner 150 may acquire a status of a task and change the driving mode of the vehicle M to a driving mode with a heavier task when the task associated with the determined driving mode is not performed by a driver.

For example, in mode A, when a driver takes a posture with which the driver cannot transition to manual driving in response to a request from the system (for example, when the driver is looking off a permitted area or when a sign for making driving difficult is detected), the mode determiner 150 causes the HMI controller 170 to perform control for prompting the driver to transition to manual driving of mode E using the HMI 30. When the driver does not respond even with the elapse of a predetermined time after the HMI controller 170 has been caused to perform control for prompting the driver to transition to manual driving or when it is estimated that the driver is in a state in which the driver cannot perform manual driving, the mode determiner 150 performs control such that the vehicle M stops at a target position through automated driving in the MRM mode and stopping (ending) the automated driving after the vehicle M has stopped. After the automated driving has been stopped, the vehicle M enters mode D or E and the vehicle M can be started by the driver's manual operation. This is the same for "stopping of automated driving."

In mode B, when the driver does not monitor a space in front of the vehicle, the mode determiner 150 prompts the driver to perform forward monitoring using the HMI 30, and performs control such that the vehicle M is stopped at the target position and automated driving is stopped when the driver does not respond. In mode C, when the driver does not perform forward monitoring or when the driver does not grasp the steering wheel 82, the mode determiner 150 prompts the driver to perform forward monitoring or grasping of the steering wheel 82 using the HMI 30, and performs control such that the vehicle M is stopped at the target position and automated driving is stopped when the driver does not respond. In mode C or D, when lane change is not performed until the vehicle M arrives at a predetermined position, control may be performed such that the vehicle M is stopped at the target position and automated driving is stopped.

The driver state determiner 152 determines whether an occupant (a driver) is in a state in which the occupant is suitable for driving. For example, the driver state determiner 152 monitors the driver's state to change (switch) the mode and determines whether the driver is in a state corresponding to a task. For example, the driver state determiner 152 performs a posture estimating process by analyzing an image captured by the driver monitoring camera 70 and determines whether the driver takes a posture with which the driver cannot transit to manual driving in response to a request from the system. The driver state determiner 152 performs a sightline estimating process by analyzing an image captured by the driver monitoring camera 70 and determines whether the driver is monitoring the surroundings (more specifically the front) of the vehicle M. When it is determined for a predetermined time or more that the driver is not in the state corresponding to the task, the driver state determiner 152 determines that the driver is in a state not suitable for driving of the task. When it is determined that the driver is in the state corresponding to the task, the driver state determiner 152 determines that the driver is in the state suitable for driving of the task. The driver state determiner 152 may determine whether an occupant is in a driving turnover-possible state.

The mode determiner 150 determines the driving mode of the vehicle M on the basis of the recognition result from the recognizer 130 and the determination result from the driver state determiner 152. The mode switching processor 154 performs various processes for switching to the mode determined by the mode determiner 150. For example, the mode switching processor 154 instructs a driving support device (not illustrated) to operate, controls the HMI 30 such that behavior of the driver is prompted, or instructs the movement plan creator 140 to generate a target trajectory for emergency stop.

The second controller 160 controls the travel driving force output device 200, the brake device 210, and the steering device 220 such that the vehicle M travels along a target trajectory created by the movement plan creator 140 as scheduled.

The second controller 160 includes, for example, an acquirer 162, a speed controller 164, and a steering controller 166. The acquirer 162 acquires information of a target trajectory (trajectory points) created by the movement plan creator 140 and stores the acquired information in a memory (not illustrated). The speed controller 164 controls the travel driving force output device 200 or the brake device 210 on the basis of a speed element accessory to the target trajectory stored in the memory. The steering controller 166 controls the steering device 220 on the basis of a curve state of the target trajectory stored in the memory. The processes of the speed controller 164 and the steering controller 166 are realized, for example, in combination of feed-forward control and feedback control. For example, the steering controller 166 performs a combination of feed-forward control based on a curvature of a road in front of the vehicle M and feedback control based on a separation from the target trajectory.

The HMI controller 170 notifies an occupant of predetermined information using the HMI 30. The predetermined information includes, for example, information associated with traveling of the vehicle M such as information on the state of the vehicle M and information on driving control. The information associated with the state of the vehicle M includes, for example, a speed, an engine rotation speed, a shift position, and the like of the vehicle M. The information on driving control may include, for example, an inquiry about whether to perform lane change, information indicating whether to perform a driving mode, information on change of a driving mode, and information associated with a status of a driving mode. The information on driving control may include information for prompting an occupant to perform a task which is imposed on the occupant to change the driving mode of the vehicle M or a task corresponding to the target mode when the recognizer 130 has become unable to recognize the position of the vehicle M.

The predetermined information may include information not associated with traveling control of the vehicle M such as television programs and contents (for example, movies) stored in a storage medium such as a DVD. The predetermined information may include, for example, information on a current position or a destination of the host vehicle M and an amount of residual fuel.

For example, the HMI controller 170 may generate an image including the predetermined information and cause a display device of the HMI 30 to display the generated image or may generate sound indicating the predetermined information and output the generated sound from a speaker of the HMI 30. The HMI controller 170 may output information received by the HMI 30 to the communication device 20, the navigation device 50, the first controller 120, and the like.

The travel driving force output device 200 outputs a travel driving force (a torque) for allowing the vehicle to travel to driving wheels. The travel driving force output device 200 includes, for example, a combination of an internal combustion engine, an electric motor, and a transmission and an electronic control unit (ECU) that controls them. The ECU controls the elements on the basis of information input from the second controller 160 or information input form the driving operator 80.

The brake device 210 includes, for example, a brake caliper, a cylinder that transmits a hydraulic pressure to the brake caliper, an electric motor that generates a hydraulic pressure in the cylinder, and a brake ECU. The brake ECU controls the electric motor on the basis of the information input from the second controller 160 or the information input from the driving operator 80 such that a brake torque based on a braking operation is output to vehicle wheels. The brake device 210 may include a mechanism for transmitting a hydraulic pressure generated by an operation of a brake pedal included in the driving operator 80 to the cylinder via a master cylinder as a backup. The brake device 210 is not limited to the above-mentioned configuration, and may be an electronically controlled hydraulic brake device that controls an actuator on the basis of information input from the second controller 160 such that the hydraulic pressure of the master cylinder is transmitted to the cylinder.

The steering device 220 includes, for example, a steering ECU and an electric motor. The electric motor changes a direction of turning wheels, for example, by applying a force to a rack-and-pinion mechanism. The steering ECU drives the electric motor on the basis of the information input from the second controller 160 or the information input from the driving operator 80 to change the direction of the turning wheels.

[Mode Switching Based on Recognition State of Vehicle Position]

Figure 4:
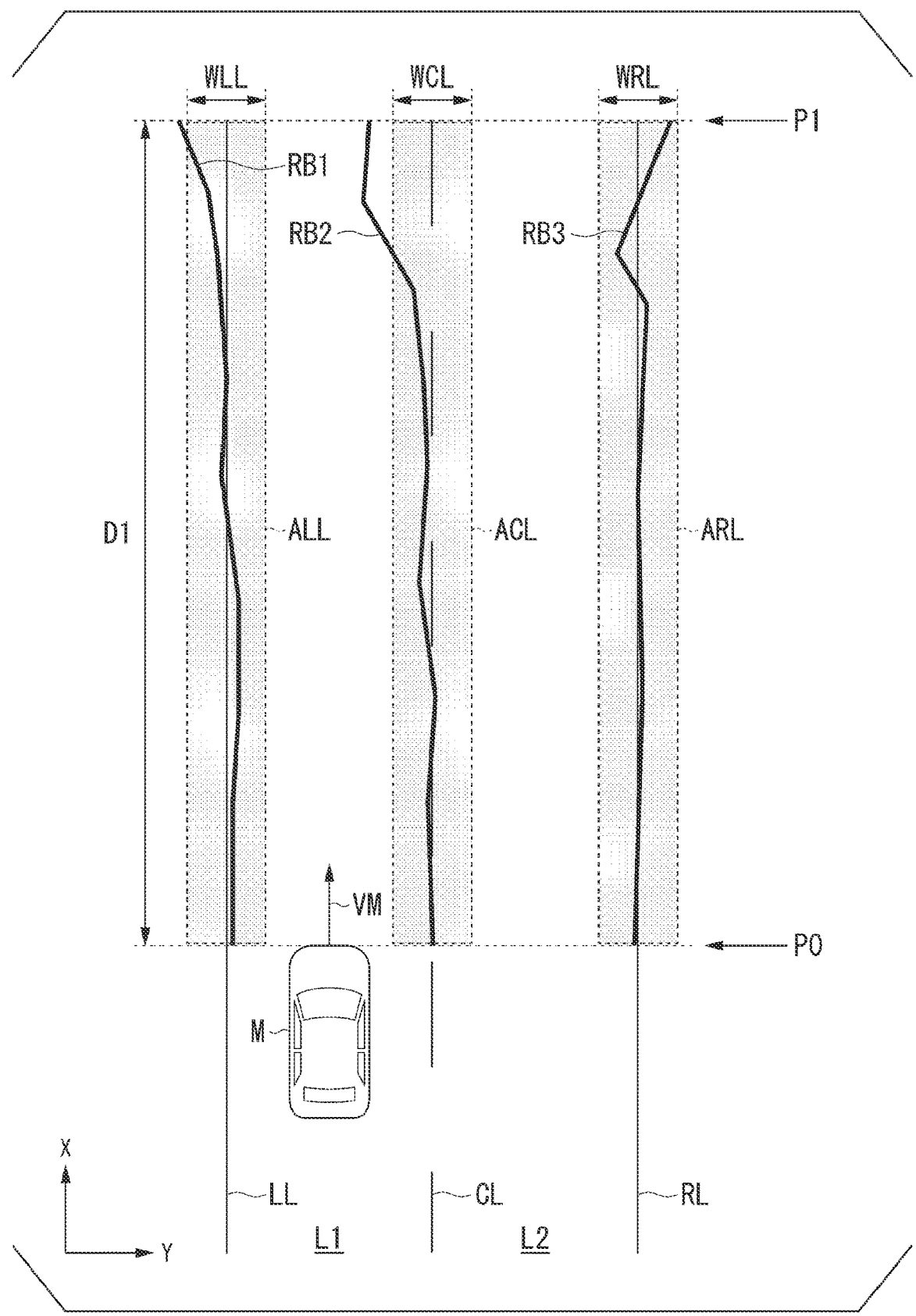
FIG. 4 is a diagram illustrating recognition of a vehicle position.

A specific example of switching of a driving mode based on a recognition state of the position of the vehicle M in the vehicle position recognizer 134 will be described below with reference to the accompanying drawings. FIG. 4 is a diagram illustrating recognition of a vehicle position. In the example illustrated in FIG. 4, two lanes L1 and L2 extending in the same direction (an X-axis direction in FIG. 4) are illustrated. The lane L1 is defined by road marking lines LL and CL, and the lane L2 is defined by road marking lines CL and RL. It is assumed that the vehicle M is traveling at a speed VM in the lane L1.

The first recognizer 134A recognizes first road information including a first road marking object for defining a road on which the vehicle M is traveling on the basis of information input from an external sensor. For example, the first recognizer 134A analyzes an image captured by the camera 10 and recognizes a lane mark drawn on the road as the first road marking object from information such as colors or shapes in the image which is the analysis result. The first recognizer 134A may recognize a pattern of the first road marking object (for example, a layout of a solid line and a dotted line). The first recognizer 134A may determine whether the road marking object is a boundary including a structure on the basis of shape information included in an image captured by the camera 10 and position or distance information of an object acquired from the radar device 12 or the LIDAR device 14. Since the detection result from the radar device 12 or the LIDAR device 14 varies depending on whether there is a structure, it is possible to more appropriately recognize whether there is a structure using the radar device 12 or the LIDAR device 14. In the example illustrated in FIG. 4, first road marking objects RB1 to RB3 included in the first road information are illustrated. The first recognizer 134A may recognize only the first road marking objects for the road marking lines LL and CL for defining the lane L1 in which the vehicle M is traveling.

The second recognizer 134B acquires second road information including a first road marking object for defining a road on which the vehicle M is estimated to be traveling with reference to map information (the first map information 54 and the second map information 62) on the basis of position information of the vehicle M acquired by the position sensor included in the vehicle sensor or the GNSS receiver 51. The second recognizer 134B may acquire a pattern of the second road marking line (for example, a layout of a solid line and a dotted line) from the second map information 62. The road marking lines LL, CL, and RL illustrated in FIG. 4 are an example of the second road marking object acquired by the second recognizer 134B. The second recognizer 134B may acquire only the second road marking objects for the marking lines LL and CL for defining the lane L1 on which the vehicle M is traveling.

The matcher 134C performs matching between the first road marking object included in the first road information and the second road marking object included in the second road information and determines whether the road marking objects match. For example, the matcher 134C sets a road boundary determination area with respect to a position of the second road marking object and determines that the first road marking object and the second road marking object match when the first road marking object is included in the set road boundary determination area. When the first road marking object is not included in the road boundary determination area, the matcher 134C determines that the first road marking object and the second road marking object do not match. The road boundary determination area is, for example, a band-shaped area which has a predetermined width on at least one of the right and left sides in a direction (that is, a width direction of a lane) perpendicular to a longitudinal direction of the second road marking object (that is, an extending direction of a lane) and which is expressed by extending the width by a predetermined distance in the longitudinal direction of the second road marking object (a marking line). In the example illustrated in FIG. 4, the road boundary determination area is set such that the second road marking object is located at the center of each band-shaped area.

In the example illustrated in FIG. 4, widths WLL, WCL, and WRL extending in the direction perpendicular to the longitudinal direction of the marking lines LL, CL, and RL with respect to the positions of the marking lines LL, CL, and RL which are the second road marking objects are set, and areas formed by extending the set widths WLL, WCL, and WRL from a reference point P0 to a point P1 by a predetermined distance (for example, a section D1) in the longitudinal direction of the marking lines LL, CL, and RL are set as road boundary determination areas ALL, ACL, and ARL. The reference point P0 is a point based on the position of the vehicle M detected by the vehicle sensor 40 and is, for example, one position out of a position of the head (a front end) of the vehicle M, a center position of the vehicle M, and an installation position of the position sensor or the camera 10. The predetermined distance D1 is, for example, a distance with which the first road marking objects are estimated to be detected with predetermined precision by an external sensor. The predetermined distance D1 may be, for example, a fixed distance or may vary according to the vehicle speed of the vehicle M or road conditions (for example, a tunnel, a quick curve, a gradient, the number of lanes, a lane width).

When the first road marking objects recognized by the first recognizer 134A are included in the set road boundary determination area, the matcher 134C determines that the second road marking objects and the first road marking objects match. In the example illustrated in FIG. 4, the matcher 134C determines whether a first road marking object RB1 is included in the road boundary determination area ALL, and determines that the road marking line LL and the first road marking object RB1 match when it determines that the first road marking object RB1 is included in the road boundary determination area ALL. Similarly, the matcher 134C determines whether a first road marking object RB2 is included in the road boundary determination area ACL, and determines that the road marking line CL and the first road marking object RB2 match when it determines that the first road marking object RB2 is included in the road boundary determination area ACL. The matcher 134C determines whether a first road marking object RB3 is included in the road boundary determination area ARL, and determines that the road marking line RL and the first road marking object RB3 match when it determines that the first road marking object RB3 is included in the road boundary determination area ARL.

The matcher 134C may determine that the first road marking object is present in an area even when a part of the first road marking object is present outside of the area in addition to when the whole first road marking object is included in the area in a predetermined section (for example, a section D1). In this case, the matcher 134C calculates, for example, a proportion at which the first road marking object in the predetermined section is present in the road boundary determination area and determines that the second road marking object and the first road marking object match when the calculated proportion is equal to or greater than a threshold value. The matcher 134C may determine a state in which recognition accuracy has decreased (deteriorated) or a state in which an object has become unable to be recognized as well as determining whether the objects match by setting a plurality of threshold values. For example, the matcher 134C recognizes the state in which recognition accuracy has decreased when a matching rate (proportion) is equal to or less than a first threshold value (for example, 60%), and recognizes the state in which an object has become unable to be recognized when the matching rate is equal to or less than a second threshold value (for example, 30%). The state in which recognition accuracy has decreased or the state in which an object has become unable to be recognized can be caused, for example, when a road marking line is thinned (or faded out) or when the weather is not fair (rainy or snowy), it is affected by an abnormality of the camera 10, or map information is different from actual road conditions (it is an old map).

The matcher 134C may directly compare the first road marking object and the second road marking object instead of comparing the first road marking object with the road boundary determination area. The matcher 134C may determine whether the first road information and the second road information match using an object included in the road information (for example, a structure such as a traffic signal or a wall or fence along the road) in addition to (or instead of) a road marking object. The matcher 134C determines whether the second road marking object and the first road marking object match at intervals of a predetermined cycle.

When it is determined that the second road marking object and the first road marking object match, the matcher 134C recognizes the position of the vehicle M in the traveling lane (the lane L1 in FIG. 4), for example, using the position of the second road marking object as a road boundary and outputs the result of recognition or the like to the movement plan creator 140. When it is determined that the second road marking object and the first road marking object do not match, the matcher 134C determines that the position of the vehicle M on the road cannot be identified. The result of matching from the matcher 134C is output to the mode determiner 150.

For example, when the matcher 134C determines that the position of the vehicle M on the road is not able to be recognized while the vehicle M is performing a predetermined driving mode in which automated driving or driving support is performed, the mode determiner 150 outputs information indicating that the driving mode is to be switched or information on a task which is imposed on an occupant and which corresponds to a driving mode to which the driving mode is to be switched from the HMI using the HMI controller 170. When the position of the vehicle M is not able to be recognized and predetermined switching conditions for switching the driving mode of the vehicle M are satisfied, the mode determiner 150 switches the current driving mode to a driving mode with a heavier task imposed on an occupant. In the following description, an example of a driving mode switching pattern will be divisionally described as several patterns on the basis of the switching conditions.

<First Switching Pattern>

Switching conditions in a first switching pattern include a condition that a predetermined time elapses after the position of the vehicle M has become unable to be recognized. In the first switching pattern, when the vehicle M is performing modes A to D and the predetermined time has elapsed after the matcher 134C has determined that the position of the vehicle M is not able to be recognized, the mode determiner 150 determines that the switching conditions are satisfied and switches the driving mode of the vehicle M to a mode with a heavier task imposed on the occupant than that of the current mode. The predetermined time may be a fixed time or may be a variable time which is set according to the speed or the surrounding situations of the vehicle M.

For example, when the current driving mode is mode A, the mode determiner 150 switches the current driving mode to one mode of modes B to E after the predetermined time has elapsed after the position of the vehicle M has become unable to be recognized. When the current driving mode is mode B, the mode determiner 150 switches the current driving mode to one mode of modes C to E after the predetermined time has elapsed after the position of the vehicle M has become unable to be recognized.

When one of modes A to D is being performed, the mode determiner 150 may switch the current driving mode to mode E (manual driving) after the predetermined time has elapsed after the position of the vehicle M has become unable to be recognized. In this case, automated driving or driving support which is performed by the driving controller is stopped.

Until the predetermined time elapses after the position of the vehicle M has become unable to be recognized, the driving controller estimates the position of the vehicle M on the road, for example, using one of the first road information and the second road information and performs driving control on the basis of the estimated position. In this case, the driving controller may perform control such that the speed is decreased to allow the vehicle M to travel more safely.

With the first switching pattern, it is possible to allow an occupant to perform a task corresponding to a mode to which the driving mode is to be switched with time to spare by switching the driving mode after the predetermined time has elapsed instead of switching the driving mode immediately after the position of the vehicle M has become unable to be recognized.

<Second Switching Pattern>

Figure 5:
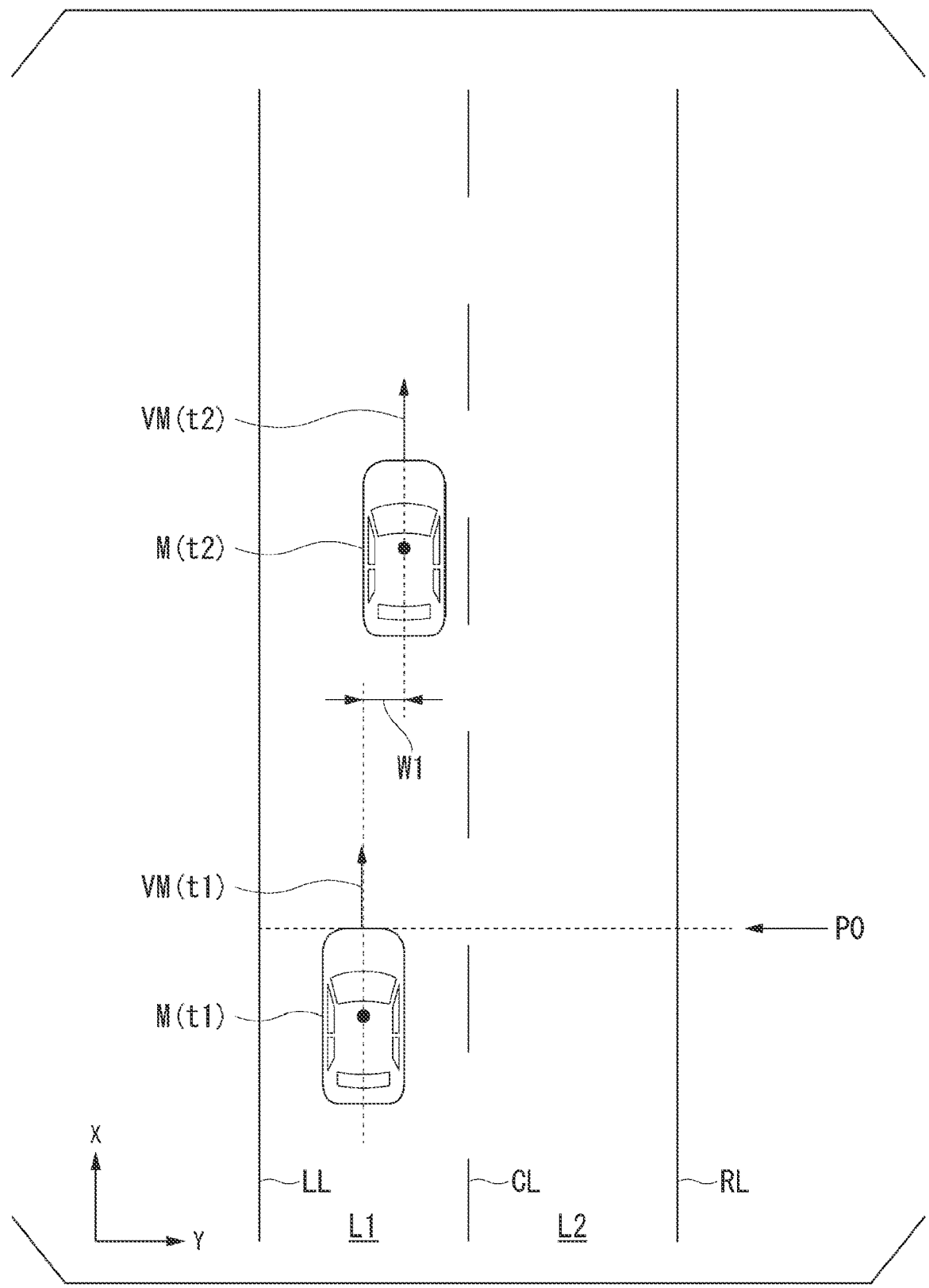
FIG. 5 is a diagram illustrating a second switching pattern.

A second switching pattern will be described below. FIG. 5 is a diagram illustrating the second switching pattern. Switching conditions in the second switching pattern include a condition that the vehicle M moves in the width direction of the traveling lane by a predetermined width or more after the position of the vehicle M has become unable to be recognized.

In the example illustrated in FIG. 5, time t2 is a time point subsequent to time t1. It is defined that the position of the vehicle M at time t* is expressed as M(t*) and the speed VM of the vehicle M is expressed as VM(t*). In the example illustrated in FIG. 5, it is assumed that the matcher 134C determines that the position of the vehicle M is not able to be recognized at time t1 at which the vehicle M reaches a point P0 of the lane L1.

In the second switching pattern, when the matcher 134C determines that the position of the vehicle M is not able to be recognized, the mode determiner 150 acquires the position of the vehicle WM on the traveling lane L1. In this case, the mode determiner 150 acquires the position (the position of a reference point) of the vehicle M on the traveling lane L1 using the first road information or the second road information. The mode determiner 150 acquires a movement width W1 in the width direction of the lane L1 at the acquired position and switches the current driving mode to a mode with a heavier task imposed on an occupant than that of the current driving mode when the acquired movement width W1 is equal to or greater than a predetermined width (for example, about 0.35 [m]). In the example illustrated in FIG. 5, time t2 indicates a time point at which the movement width W1 becomes equal to or greater than the predetermined width. The predetermined width may be a fixed value or may be a variable value which is set on the basis of the position of the vehicle M, a vehicle width, or a road width.

With the second switching pattern, it is possible to adjust the timing at which the driving mode is switched on the basis of behavior of the vehicle M after the position of the vehicle M has become unable to be recognized by the matcher 134C. With the second switching pattern, it is possible to prevent the driving mode from being switched immediately when the position of the vehicle M is not able to be recognized and to give time to perform a task to an occupant. With the second switching pattern, when movement in the lane width direction of the vehicle M is less than a predetermined width, the vehicle M is traveling stably in the traveling lane and thus it is possible to perform more appropriate driving control by curbing switching of the driving mode in the meanwhile.

<Third Switching Pattern>

Figure 6:
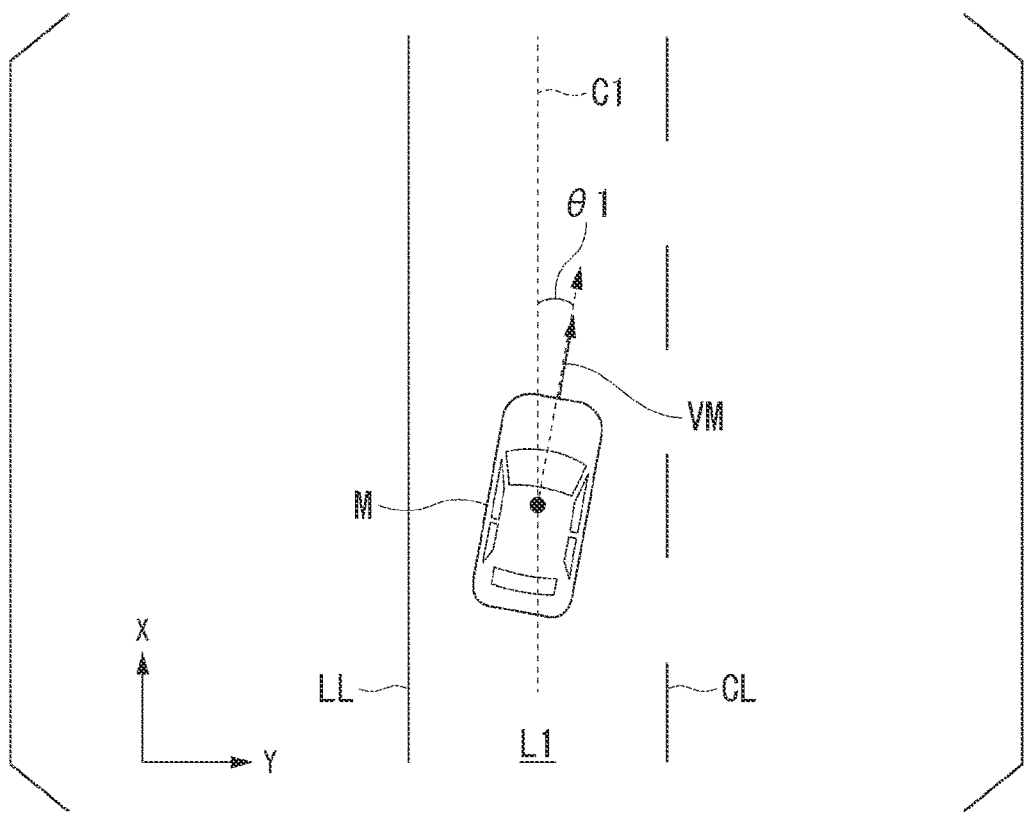
FIG. 6 is a diagram illustrating a third switching pattern.

A third switching pattern will be described below. FIG. 6 is a diagram illustrating the third switching pattern. Switching conditions in the third switching pattern include a condition that the vehicle M travels a travelable distance (hereinafter referred to as a "first travelable distance") which is derived on the basis of the speed VM of the vehicle M and the direction of the vehicle M at a time point at which the position of the vehicle M has become unable to be recognized after the position of the vehicle M has become unable to be recognized.

In the example illustrated in FIG. 6, the state of the vehicle M with respect to the traveling lane L1 at a time point at which the matcher 134C determines that the position of the vehicle M is not able to be recognized is illustrated. In the third switching pattern, when it is determined that the position of the vehicle M is not able to be recognized, the mode determiner 150 derives an angle θ1 with respect to a line Cl formed by connecting the centers of the lane L1 on which the vehicle M is traveling as the direction of the vehicle M on the basis of a yaw rate angle or a steering angle of the vehicle M detected by the vehicle sensor 40, the direction of the wheels with respect to the forward direction of the vehicle M, and the like.

Then, the mode determiner 150 derives the first travelable distance on the basis of the speed VM and the direction (the angle θ1) of the vehicle M at the time point at which it is determined that the position of the vehicle M is not able to be recognized. For example, when the vehicle M continues to travel at the same speed and in the same direction, the mode determiner 150 derives the first travelable distance in which the vehicle M does not travel over the marking lines LL and CL of the lane L1 and a certain time to switch the mode can be secured. For example, the mode determiner 150 sets the travelable distance to be longer as the angle θ1 becomes less and sets the travelable distance to be longer as the speed VM becomes higher. The first travelable distance may be derived, for example, using a predetermined function with the speed and the angle as inputs and with the distance as an output, or may be derived using a table in which the distance is correlated with the speed and the angle.

The mode determiner 150 switches the driving mode of the vehicle M to a mode with a heavier task imposed on an occupant than that of the current mode after the vehicle M has traveled the first travelable distance from the time point at which the position of the vehicle M has become unable to be recognized by the matcher 134C.

With the third switching pattern, since the driving mode is switched after the vehicle M has traveled the first travelable distance derived on the basis of the states (the speed or direction) of the vehicle M at the time point at which the position of the vehicle M has become unable to be recognized after the position of the vehicle M has become unable to be recognized, time to spare for performing a task can be given to an occupant and thus it is possible to perform more appropriate driving control.

<Fourth Switching Pattern>

Figure 7:
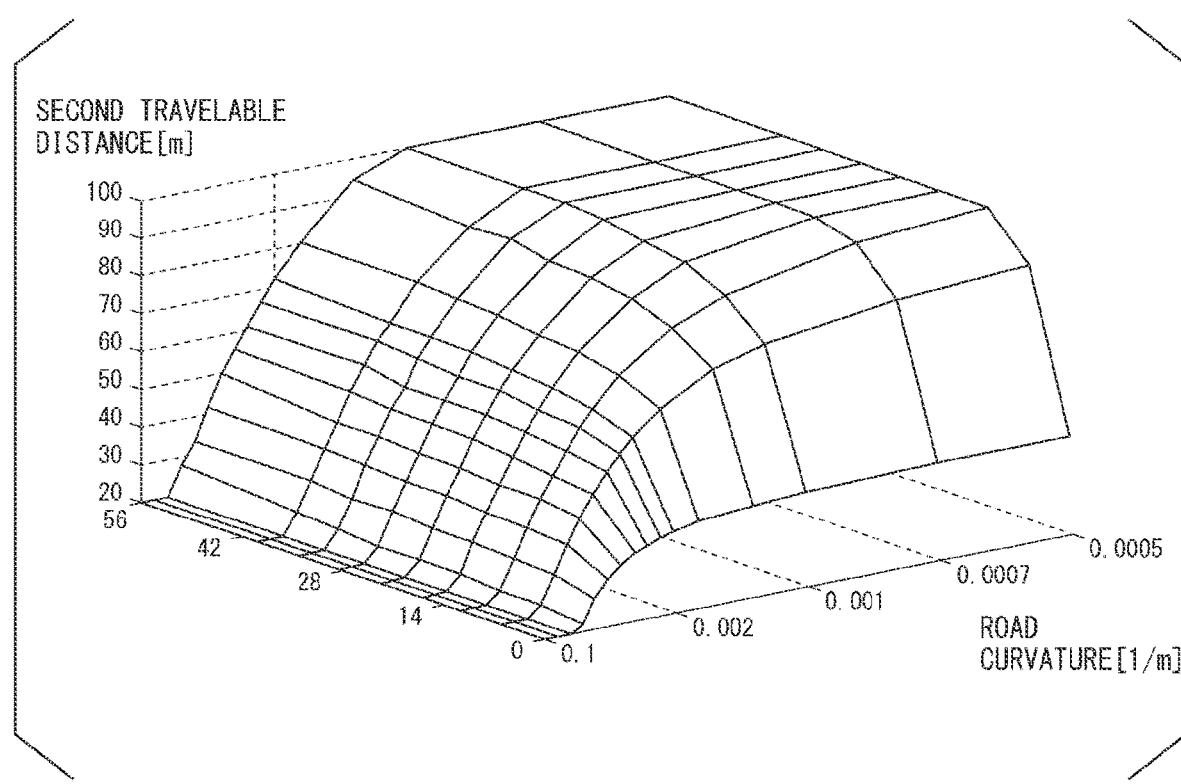
FIG. 7 is a diagram illustrating a fourth switching pattern.

A fourth switching pattern will be described below. FIG. 7 is a diagram illustrating the fourth switching pattern. Switching conditions in the fourth switching pattern include a condition that the vehicle M travels a travelable distance (hereinafter referred to as a "second travelable distance") which is derived on the basis of the speed VM of the vehicle M and curvature information (a curvature is used in the following description) of a traveling road (the lane L1) of the vehicle M at a time point at which the position of the vehicle M has become unable to be recognized after the position of the vehicle M has become unable to be recognized. In the example illustrated in FIG. 7, a three-dimensional graph with a curvature [1/m] of the traveling road of the vehicle M, the speed [m/s] of the vehicle M, and the second travelable distance [m] as axes is illustrated. In the example illustrated in FIG. 7, a traveling distance serving as a performance limit of a vehicle is correlated with the speed VM of the vehicle M and the curvature of the traveling road of the vehicle M. The correspondence illustrated in FIG. 7 may vary depending on the models of the vehicle M.

In the fourth switching pattern, when the matcher 134C determines that the position of the vehicle M is not able to be recognized, the mode determiner 150 acquires the speed VM of the vehicle M at the time point and a curvature of the traveling lane based on the map information or the result of detection from the external sensor and acquires the second travelable distance with reference to the graph illustrated in FIG. 7 on the basis of the acquired speed and the acquired curvature. In the example illustrated in FIG. 7, as the curvature becomes smaller, the curved road becomes slower curved, the second travelable distance becomes greater. As the speed VM becomes higher, the second travelable distance becomes greater to secure a time until the mode is switched. In the example illustrated in FIG. 7, a lower limit (20 [m] in the drawing) and an upper limit (100 [m] in the drawing) of the second travelable distance are provided, but the numerical values are not limited thereto. The second travelable distance may be derived using a predetermined function with a speed and a curvature as inputs and with a distance as an output.

After the vehicle M has traveled the second travelable distance from the time point at which the position of the vehicle M has become unable to be recognized by the matcher 134C, the mode determiner 150 switches the current driving mode of the vehicle M to a mode with a heavier task imposed on an occupant than that of the current driving mode.

With the fourth switching pattern, by switching the driving mode when the vehicle M has traveled the second travelable distance derived on the basis of the state (speed) of the vehicle M at the time point at which the position of the vehicle M has become unable to be recognized and road information (for example, curvature information of a road) after the position of the vehicle M has become unable to be recognized, time to perform a task is given to an occupant and thus it is possible to perform more appropriate driving control.

<Fifth Switching Pattern>

Figure 8:
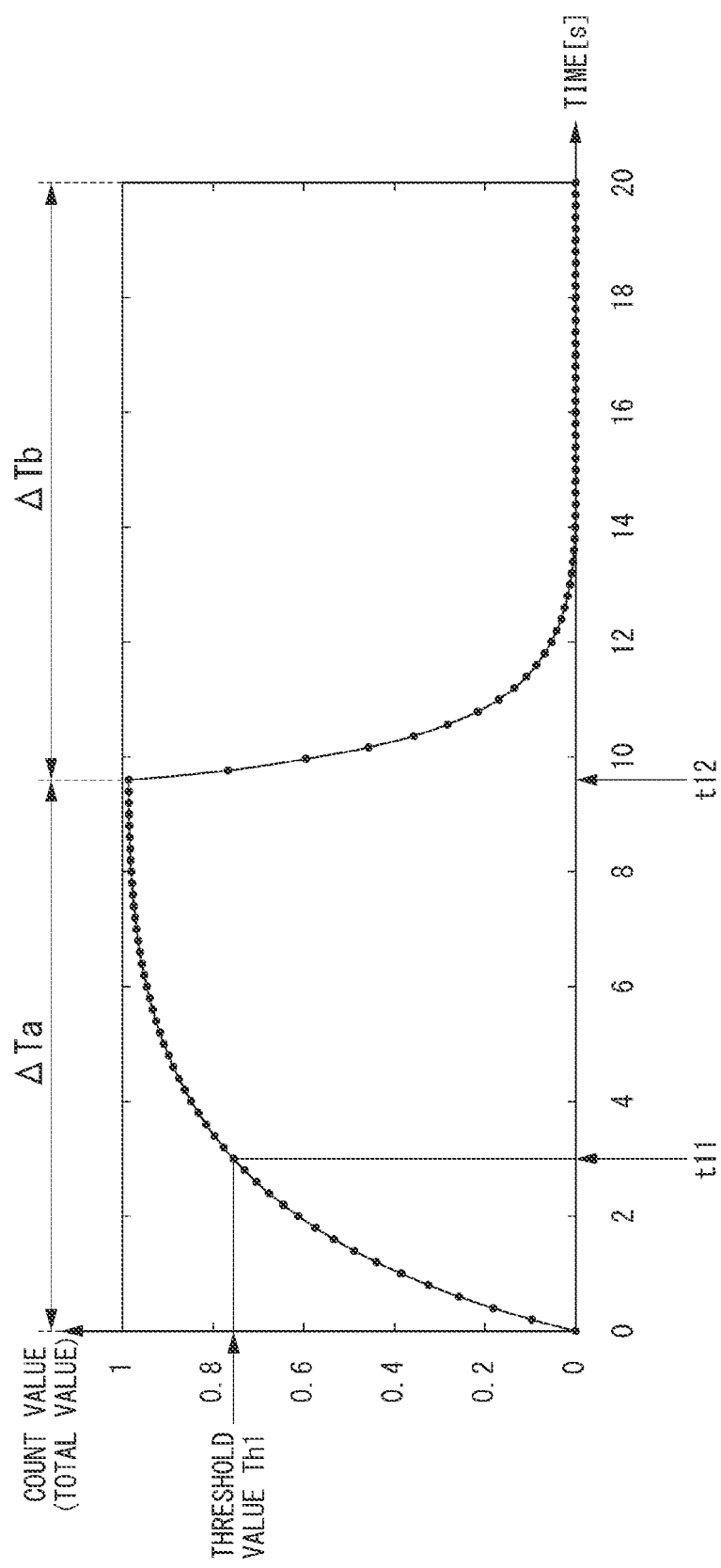
FIG. 8 is a diagram illustrating a fifth switching pattern.

A fifth switching pattern will be described below. FIG. 8 is a diagram illustrating the fifth switching pattern. The horizontal axis in FIG. 8 represents time [s] and the vertical axis represents a count value (a total value). In the example illustrated in FIG. 8, ΔTa denotes a period in which matching fails and ΔTb denotes a period in which matching succeeds. The fifth switching pattern is a switching pattern in which the count value is increased by the counter 134D in the state in which the position of the vehicle M has become unable to be recognized and the mode is switched when the total value of the count value is equal to or greater than a threshold value.

In the fifth switching pattern, when the position of the vehicle M is not able to be recognized, the counter 134D increases the count value at a first rate of increase. The first rate of increase may be a nonlinear increase with the elapse of time or may be a linear increase such that the time and the rate of increase of the count value are proportional to each other. The nonlinear increase may mean a logarithmic or exponential increase (a monotonous increase) or may be a gradual increase, for example, according to curve information.

When the value (count value) counted by the counter 134D is equal to or greater than a threshold value Th1, the mode determiner 150 switches the driving mode of the vehicle M to a mode with a heavier task imposed on an occupant than that of the current mode. In the example illustrated in FIG. 8, since the count value is equal to or greater than the threshold value Th1 when a time t11 has elapsed after the position of the vehicle M has become unable to be recognized, switching of the driving mode is performed at a time point at which the time t11 has elapsed.

The counter 134D may set an upper limit greater than the threshold value Th1 and stop counting when the count value reaches the upper limit. When matching succeeds and the position of the vehicle M is able to be recognized after the position of the vehicle M has become unable to be recognized, the counter 134D may decrease the count value. In the example illustrated in FIG. 8, since the position of the vehicle M becomes able to be recognized at a time point at which a time t12 has elapsed from the time point at which the position of the vehicle M is not able to be recognized, the current count value is decreased. In this case, the counter 134D decreases the count value at a first rate of decrease. The first rate of decrease may be a nonlinear increase with the elapse of time or may be a nonlinear increase. The counter 134D sets an absolute value of the first rate of decrease to be greater than an absolute value of the first rate of increase. Accordingly, it is possible to return the count value to an initial value (for example, 0 (zero)) early.

Figure 9:
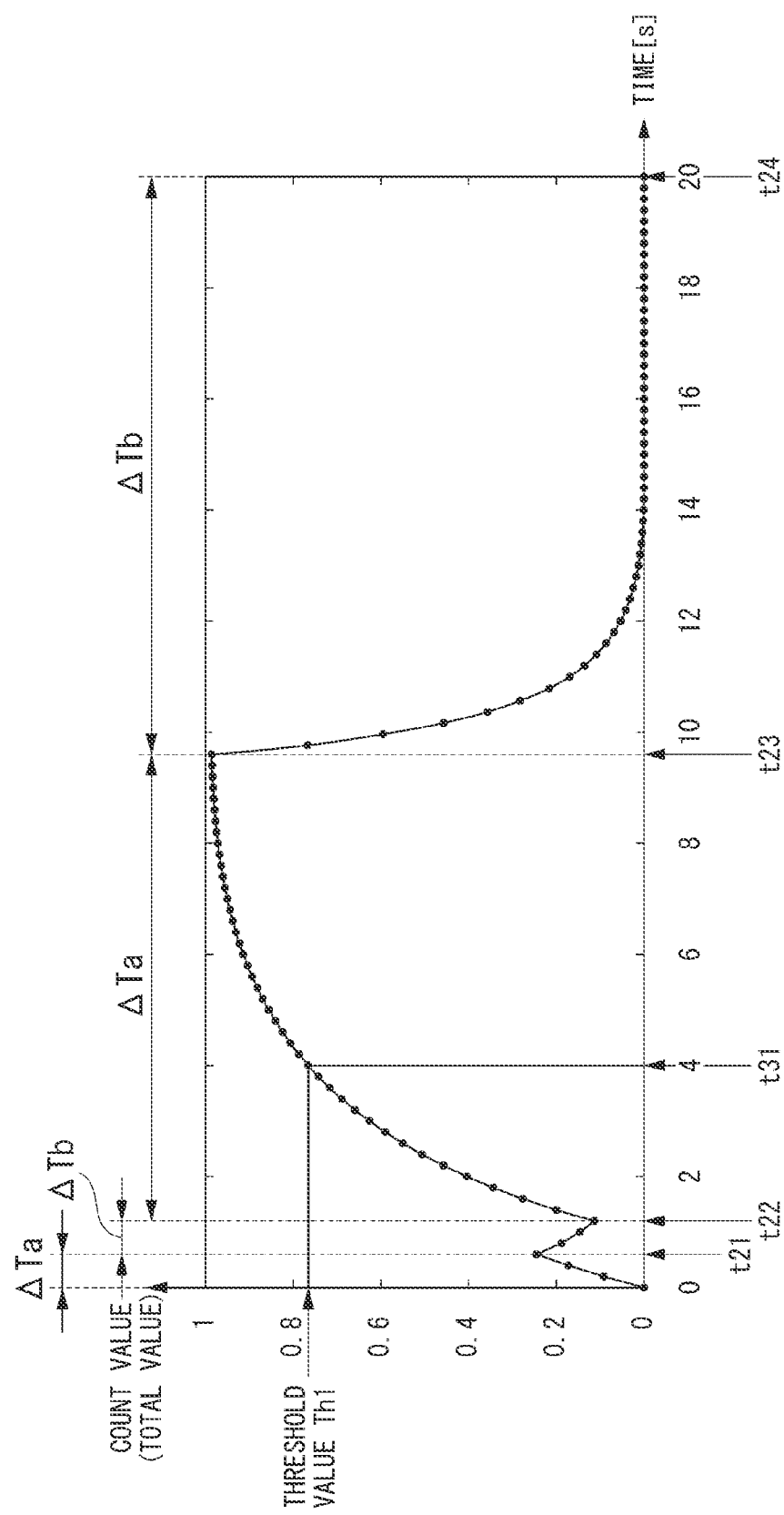
FIG. 9 is a diagram illustrating change of a count value in a haunting case.

The counter 134D may change a rate of increase of the count value in matching failure when a success period and a failure period of matching are repeatedly present (mixed) in a predetermined period (hereinafter referred to as a "haunting case"). FIG. 9 is a diagram illustrating change of the count value in a haunting case. In the example illustrated in FIG. 9, it is assumed that matching fails in a period from a time point at which the position of the vehicle M has become unable to be recognized to time t21 (hereinafter referred to as a first period), matching succeeds in a period from time t21 to time t22 (hereinafter referred to as a second period), matching fails in a period from time t22 to time t23 (hereinafter referred to as a third period), and matching succeeds in a period from time t23 to time t24 (hereinafter referred to as a fourth period).

In the example illustrated in FIG. 9, the counter 134D increases the count value at the first rate of increase in the first period and decreases the count value at the first rate of decrease in the second period. The counter 134D increases the count value at the second rate of increase in the middle of the decreasing count value in the third period. Accordingly, it is possible to switch the driving mode of the vehicle M without being excessively delayed from the time point at which the matcher 134C has first determined that the position of the vehicle M is not able to be recognized. The first rate of increase and the second rate of increase may be set to the same value or one thereof may be set to be greater than the other.

With the fifth switching pattern, it is possible to switch the driving mode at a more appropriate timing using the count value.

Each of the first to fifth switching patterns may be combined with another switching pattern partially or wholly. For example, when the switching conditions in the first switching pattern (the condition that the predetermined time elapses) are satisfied before the vehicle M travels the first travelable distance in the third switching pattern or the second travelable distance in the fourth switching pattern, the driving mode of the vehicle M may be switched to a driving mode with a heavier task imposed on an occupant of the vehicle M than that of the current driving mode. The mode determiner 150 may determine the type of mode to which the driving mode is to be switched depending on in which switching pattern of the first to fifth switching patterns the switching conditions are satisfied.

When the state in which the position of the vehicle M is able to be recognized is maintained for a predetermined time or more after the driving mode has been switched to a driving mode with a heavier task imposed on an occupant of the vehicle M than the current driving mode of the vehicle M on the basis of the aforementioned switching patterns or the like, the mode determiner 150 may return the driving mode of the vehicle M to the original mode.

[Process Flow]

Figure 10:
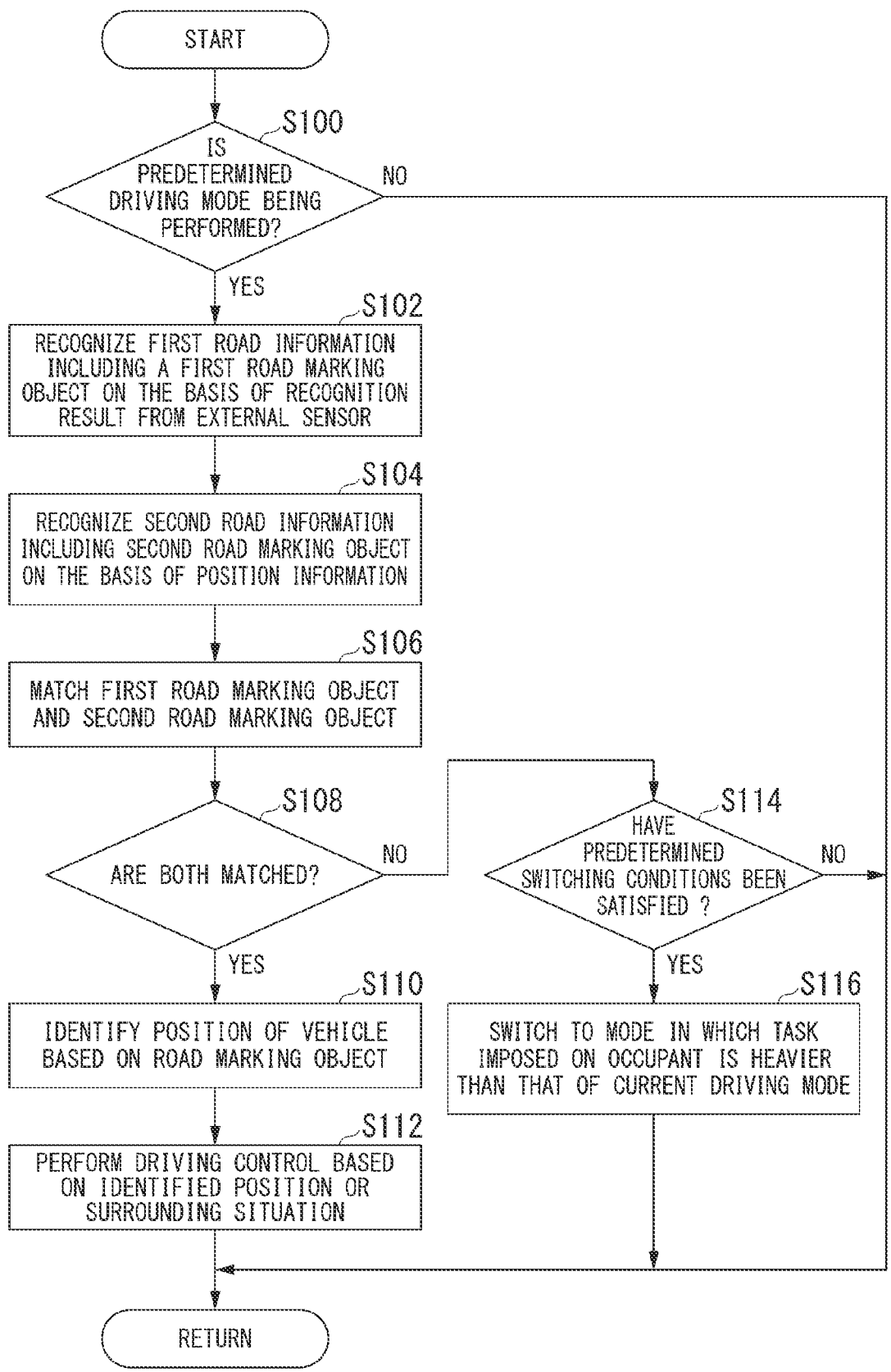
FIG. 10 is a flowchart illustrating an example of a routine which is performed by an automated driving control device 100 according to the embodiment.

FIG. 10 is a flowchart illustrating an example of a routine which is performed by the automated driving control device 100 according to the embodiment. In the example illustrated in FIG. 10, a mode switching process when it is determined that the position of the vehicle M is not able to be identified by the recognizer 130 out of the routine performed by the automated driving control device 100 will be mainly described. The routine illustrated in FIG. 10 may be performed, for example, repeatedly at predetermined timings or at intervals of a predetermined cycle.

In the example illustrated in FIG. 10, the mode determiner 150 determines whether the vehicle M is performing a predetermined driving mode (Step S100). The predetermined driving mode is, for example, one of modes A to D. When it is determined that the predetermined driving mode is being performed, the first recognizer 134A recognizes first road information including a first road marking object on the basis of a result of recognition from an external sensor (Step S102). Then, the second recognizer 134B recognizes second road information including a second road marking object on the basis of map information with reference to map information on the basis of position information of the vehicle M acquired from the GPS device or the GNSS receiver 51 (Step S104).

Then, the matcher 134C performs matching between the first road marking object and the second road marking object (Step S106) and determines whether the road marking objects match (Step S108). When it is determined that the road marking objects match, the matcher 134C identifies the position of the vehicle M on the traveling lane on the basis of the road marking object (Step S110). Then, the driving controller performs driving control based on the identified position or the surrounding situation of the vehicle (Step S112).

When it is determined in Step S108 that the road marking objects do not match, the mode determiner 150 determines whether predetermined switching conditions for switching the driving mode (for example, the switching conditions in the first to fifth switching patterns) are satisfied (Step S114). When it is determined that the predetermined switching conditions are satisfied, the mode determiner 150 performs control such that the driving mode of the vehicle M is switched to a driving mode with a heavier task imposed on an occupant than that of the current driving mode of the vehicle M (Step S116). In this way, the routine of the flowchart ends. When it is determined in Step S100 that the predetermined driving mode is not being performed or when it is determined in Step S114 that the predetermined switching conditions are not satisfied, the routine of the flowchart ends.

According to the aforementioned embodiment, the vehicle control device includes: the recognizer 130 configured to recognize a position of a vehicle M; the driving controller (the movement plan creator 140, the second controller 160) configured to control one or both of acceleration/deceleration and steering of the vehicle M and to cause the vehicle M to travel in one of a plurality of driving modes in which tasks imposed on an occupant of the vehicle M are different; and the mode determiner 150 configured to determine a driving mode which is to be performed by the driving controller, the recognizer 130 recognizes first road information including road marking objects near the vehicle M with respect to a position of the vehicle M on the basis of a recognition result from an external sensor, recognizes second road information including road marking objects near the vehicle M from map information on the basis of position information of the vehicle M, and performs a process of recognizing the position of the vehicle M through matching between the first road information and the second road information, and the mode determiner 150 switches the driving mode of the vehicle M to a driving mode in which a task imposed on the occupant of the vehicle M is heavier than that of the driving mode which is being performed by the vehicle M when switching conditions for switching the driving mode of the vehicle M are satisfied after the position of the vehicle M has become unable to be recognized by the recognizer 130. Accordingly, it is possible to cause the vehicle to travel under more appropriate driving control. According to the embodiment, when recognition accuracy of the position of the vehicle M which is recognized by the vehicle M decreases, it is possible switch the driving mode at a more appropriate timing.

The above-mentioned embodiment can be expressed as follows:

A vehicle control device including:

a storage device that stores a program; and a hardware processor, wherein the hardware processor is configured to execute the program stored in the storage device to perform:

recognizing a position of a vehicle;

controlling one or both of acceleration/deceleration and steering of the vehicle;

causing the vehicle to travel in one of a plurality of driving modes in which tasks imposed on an occupant of the vehicle are different;

recognizing first road information including road marking objects near the vehicle with respect to a position of the vehicle on the basis of a recognition result from an external sensor, recognizing second road information including road marking objects near the vehicle from map information on the basis of position information of the vehicle, and performing a process of recognizing the position of the vehicle through matching between the first road information and the second road information; and switching the driving mode of the vehicle to a driving mode in which a task imposed on the occupant of the vehicle is heavier than that of a driving mode which is being performed by the vehicle when switching conditions for switching the driving mode of the vehicle are satisfied after the position of the vehicle has become unable to be recognized.

While a mode for carrying out the present invention has been described above with reference to an embodiment, the invention is not limited to the embodiment and can be subjected to various modifications and substitutions without departing from the gist of the invention.

REFERENCE SIGNS LIST

1 Vehicle system
10 Camera
12 Radar device
14 LIDAR
16 Object recognition device
20 Communication device
30 HMI
32 Winker switch
40 Vehicle sensor
50 Navigation device
60 MPU
70 Driver monitoring camera
80 Driving operator
82 Steering wheel
84 Steering wheel grasp sensor
100 Automated driving control device
120 First controller
130 Recognizer
132 Object recognizer
134 Vehicle position recognizer
140 Movement plan creator
150 Mode determiner
152 Driver state determiner
154 Mode switching processor
160 Second controller
162 Acquirer
164 Speed controller
166 Steering controller
170 HMI controller
170 Storage
200 Travel driving force output device
210 Brake device
220 Steering device
M Vehicle

What is claimed is:

1. A vehicle control device comprising:
a processor that executes instructions to:
recognize a position of a vehicle;
control one or both of acceleration/deceleration and steering of the vehicle and to cause the vehicle to travel in one of a plurality of driving modes in which tasks imposed on an occupant of the vehicle are different; and
determine a driving mode which is to be performed,
wherein the processor recognizes first road information including road marking objects within a predetermined distance from the vehicle with respect to a position of the vehicle based on a recognition result from an external sensor, recognizes second road information including road marking objects within a predetermined distance from the vehicle from map information based on position information of the vehicle, and performs a process of recognizing the position of the vehicle through matching between the first road information and the second road information,
wherein the processor switches the driving mode of the vehicle to a driving mode in which a task imposed on the occupant of the vehicle is heavier when switching conditions for switching the driving mode of the vehicle are satisfied after the processor has become unable to recognize the position of the vehicle, and
wherein the switching conditions include a condition that the vehicle has moved by a predetermined width in a width direction of a travel lane and has traveled a travelable distance derived based on a speed of the vehicle and an angle of the vehicle at a time point at which the processor has become unable to recognize the position of the vehicle after recognition accuracy of the position of the vehicle has decreased.

2. The vehicle control device according to claim 1, wherein the decreasing of recognition accuracy of the position of the vehicle includes that the processor becomes unable to recognize the position of the vehicle.

3. The vehicle control device according to claim 1, wherein the switching conditions further include a condition that a predetermined time elapses after the processor has become unable to recognize the position of the vehicle.

4. The vehicle control device according to claim 1, wherein the switching conditions further include a condition that the vehicle has traveled a travelable distance derived based on a speed of the vehicle and curvature information of a road on which the vehicle is traveling at a time point at which the processor has become unable to recognize the position of the vehicle after the processor has become unable to recognize the position of the vehicle.

5. The vehicle control device according to claim 1, wherein the processor further executes instructions to increase a count value at a first rate of increase with the elapse of a time in which matching between the first road information and the second road information fails, wherein the processor switches the driving mode of the vehicle to a driving mode in which a task imposed on the occupant of the vehicle is heavier when the count value is equal to or greater than a threshold value.

6. The vehicle control device according to claim 5, wherein the processor is configured to decrease the count value at a first rate of decrease when the matching between the first road information and the second road information succeeds after the matching has failed and to increase the count value from the decreased current count value at a second rate of increase when the matching fails again.

7. The vehicle control device according to claim 6, wherein an absolute value of the first rate of decrease is greater than an absolute value of the first rate of increase.

8. A vehicle control method that is performed by a computer, the vehicle control method comprising:
recognizing a position of a vehicle;
controlling one or both of acceleration/deceleration and steering of the vehicle;
causing the vehicle to travel in one of a plurality of driving modes in which tasks imposed on an occupant of the vehicle are different;
recognizing first road information including road marking objects within a predetermined distance from the vehicle with respect to a position of the vehicle based on a recognition result from an external sensor, recognizing second road information including road marking objects within a predetermined distance from the vehicle from map information based on of position information of the vehicle, and performing a process of recognizing the position of the vehicle through matching between the first road information and the second road information; and switching the driving mode of the vehicle to a driving mode in which a task imposed on the occupant of the vehicle is heavier when switching conditions for switching the driving mode of the vehicle are satisfied after the position of the vehicle has become unable to be recognized, wherein the switching conditions include a condition that the vehicle has moved by a predetermined width in a width direction of a travel lane and has traveled a travelable distance derived based on a speed of the vehicle and an angle of the vehicle at a time point at which the processor has become unable to recognize the position of the vehicle after recognition accuracy of the position of the vehicle has decreased.

* * * * *